United States Patent
Hirota et al.

(10) Patent No.: US 12,515,508 B2
(45) Date of Patent: Jan. 6, 2026

(54) VEHICLE BODY BASE STRUCTURE

(71) Applicant: TOYOTA JIDOSHA KABUSHIKI KAISHA, Toyota Aichi-ken (JP)

(72) Inventors: Takuya Hirota, Toyota Aichi-ken (JP); Hidenori Yoshioka, Toyota Aichi-ken (JP); Koji Ogawa, Toyota Aichi-ken (JP); Shinya Katayama, Hamamatsu Shizuoka-ken (JP); Kyohei Heki, Ikeda Osaka (JP); Takayuki Omoto, Ikeda Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 432 days.

(21) Appl. No.: 18/112,013

(22) Filed: Feb. 21, 2023

(65) Prior Publication Data
US 2023/0322068 A1   Oct. 12, 2023

(30) Foreign Application Priority Data

Mar. 24, 2022   (JP) ................. 2022-048881

(51) Int. Cl.
*B60K 1/04*   (2019.01)

(52) U.S. Cl.
CPC ........ *B60K 1/04* (2013.01); *B60K 2001/0438* (2013.01)

(58) Field of Classification Search
CPC ................ B60K 1/04; B60K 2001/0438
See application file for complete search history.

(56) References Cited

U.S. PATENT DOCUMENTS

| | | | | |
|---|---|---|---|---|
| 8,657,350 | B2* | 2/2014 | Cabo | B60R 19/00 180/69.1 |
| 8,776,920 | B2* | 7/2014 | Suzuki | B60K 15/063 180/311 |
| 8,776,925 | B2* | 7/2014 | Bender | B60L 50/64 180/69.1 |
| 8,863,878 | B2* | 10/2014 | Shirooka | B60K 1/04 180/68.5 |
| 9,242,540 | B2* | 1/2016 | Shirooka | B60K 1/04 |
| 10,829,157 | B2* | 11/2020 | Kato | B60G 3/18 |
| 11,639,092 | B1* | 5/2023 | Wright | B60L 15/20 180/65.8 |
| 11,745,574 | B2* | 9/2023 | Marginet | B62D 25/2018 180/68.5 |

(Continued)

FOREIGN PATENT DOCUMENTS

| | | | |
|---|---|---|---|
| JP | 2011218910 A | * | 11/2011 |
| JP | 2016-052862 A | | 4/2016 |

(Continued)

OTHER PUBLICATIONS

Translation of JP-2011218910-A (Year: 2011).*

*Primary Examiner* — Katy M Ebner
(74) *Attorney, Agent, or Firm* — Dinsmore & Shohl LLP

(57) ABSTRACT

A vehicle body base structure includes a battery pack that is configured to supply electric power to a traction motor and that is disposed beneath a floor panel, a bracket that pivotally supports a trailing arm and that is fixed to a rear side member, and a reinforcing brace that is fixed to the bracket and that is also fixed to the battery pack. The bracket is located rearward from the battery pack in a vehicle front-rear direction.

15 Claims, 4 Drawing Sheets

(56) References Cited

U.S. PATENT DOCUMENTS

| | | | | |
|---|---|---|---|---|
| 2011/0109052 A1* | 5/2011 | Hatzikakidis | ........ | B60K 7/0007 |
| | | | | 280/124.128 |
| 2019/0047625 A1* | 2/2019 | Kato | ...................... | B62D 24/00 |
| 2019/0276081 A1* | 9/2019 | Otoguro | ................... | B60K 1/04 |
| 2020/0283067 A1* | 9/2020 | Reineke | ................. | B62D 25/20 |
| 2022/0324312 A1* | 10/2022 | Marginet | ............. | B60G 21/005 |
| 2023/0286366 A1* | 9/2023 | Sao | ......................... | B60K 1/04 |

FOREIGN PATENT DOCUMENTS

| | | |
|---|---|---|
| JP | 2016-112913 A | 6/2016 |
| JP | 2019-156030 A | 9/2019 |

* cited by examiner

VEHICLE BODY BASE STRUCTURE

CROSS-REFERENCE TO RELATED APPLICATION

This application claims priority to Japanese Patent Application No. 2022-048881 filed on Mar. 24, 2022, incorporated herein by reference in its entirety.

BACKGROUND

1. Technical Field

The present disclosure relates to a vehicle body base structure. More particularly, the present disclosure relates to a vehicle body base structure of an automobile in which a battery pack for supplying electric power to a traction motor is disposed beneath a floor panel.

2. Description of Related Art

Battery packs that supply electric power to traction motors are often disposed beneath a floor panel. Such a vehicle body base structure is disclosed in Japanese Unexamined Patent Application Publication No. 2016-112913 (JP 2016-112913 A) and Japanese Unexamined Patent Application Publication No. 2019-156030 (JP 2019-156030 A). In the structures disclosed in JP 2016-112913 A and JP 2019-156030 A, the battery pack extends to a rearward region of brackets that pivotally support trailing arms. In other words, the brackets that pivotally support the trailing arms are located to the sides of the battery pack. In the structure disclosed in JP 2016-112913 A, the brackets and the battery pack are linked via members.

SUMMARY

Rear ends of the trailing arms are linked to an axle. Distal ends of the trailing arms are pivotally supported by the brackets, and the brackets are fixed to rear side members. Vibrations of the axle are conveyed to the brackets via the trailing arms. The present disclosure provides a technology for increasing the strength of the brackets against vibrations of the trailing arm, using the battery pack.

An aspect of the present disclosure is a vehicle body base structure. The vehicle body base structure includes a battery pack, a bracket, and a reinforcing brace. The battery pack is disposed beneath a floor panel, and supplies electric power to a traction motor. The bracket pivotally supports a trailing arm and is fixed to a rear side member. The reinforcing brace is fixed to the bracket and is also fixed to the battery pack. The bracket is located rearward from the battery pack in a vehicle front-rear direction.

In the vehicle body base structure according to the present disclosure, the bracket is disposed rearward from the battery pack in the vehicle front-rear direction, and the bracket and the battery pack are linked by the reinforcing brace. Due to the vibrations of an axle, the trailing arm has a vibration component in the front-rear direction. The vibrations of the trailing arm are conveyed to the bracket, and the bracket also vibrates in the front-rear direction. Vibrations of the bracket in the front-rear direction are conveyed via the reinforcing brace to the battery pack located forward from the bracket. The battery pack receives a part of the vibration load applied to the bracket in the front-rear direction, and accordingly the strength of the bracket is increased with respect to the vibrations of the trailing arm.

In the vehicle body base structure, a fastening point of the reinforcing brace and the bracket may be located rearward from the battery pack in the vehicle front-rear direction. A route of conveying the vibration load (i.e., the fastening point of the reinforcing brace and the bracket) is located rearward from the battery pack in the vehicle front-rear direction, and accordingly the vibration load that the bracket receives from the trailing arm is effectively conveyed to the battery pack.

In the vehicle body base structure, the reinforcing brace may be fixed to a rear face of the battery pack in the vehicle front-rear direction. The vibration load is conveyed to the battery pack even more effectively. In the vehicle body base structure, the reinforcing brace may be fixed to a side face of the battery pack in the vehicle front-rear direction. The strength of linking of the reinforcing brace and the battery pack is increased.

In the vehicle body base structure, a flange may be provided extending horizontally at a lower end of the bracket, and the reinforcing brace may be fixed to the flange. The strength of the linking portion of the bracket and the reinforcing brace is increased.

In the vehicle body base structure, the reinforcing brace may be fixed to a lower face of the battery pack. Details and further improvements of the present disclosure will be described in the "DETAILED DESCRIPTION OF EMBODIMENTS" section below.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
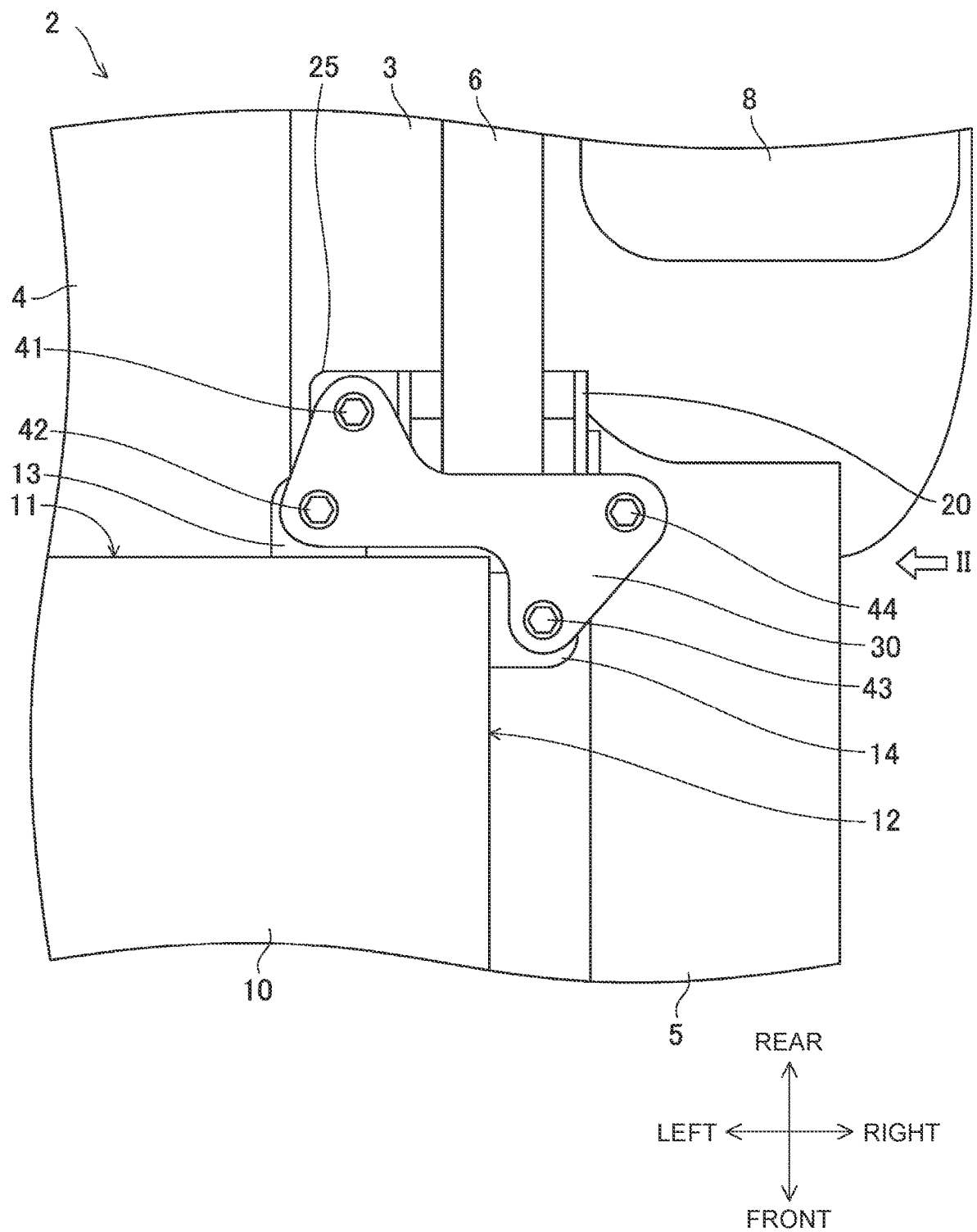
FIG. 1 is a bottom view of a vehicle body employing a vehicle body base structure according to a first embodiment.
Figure 2:
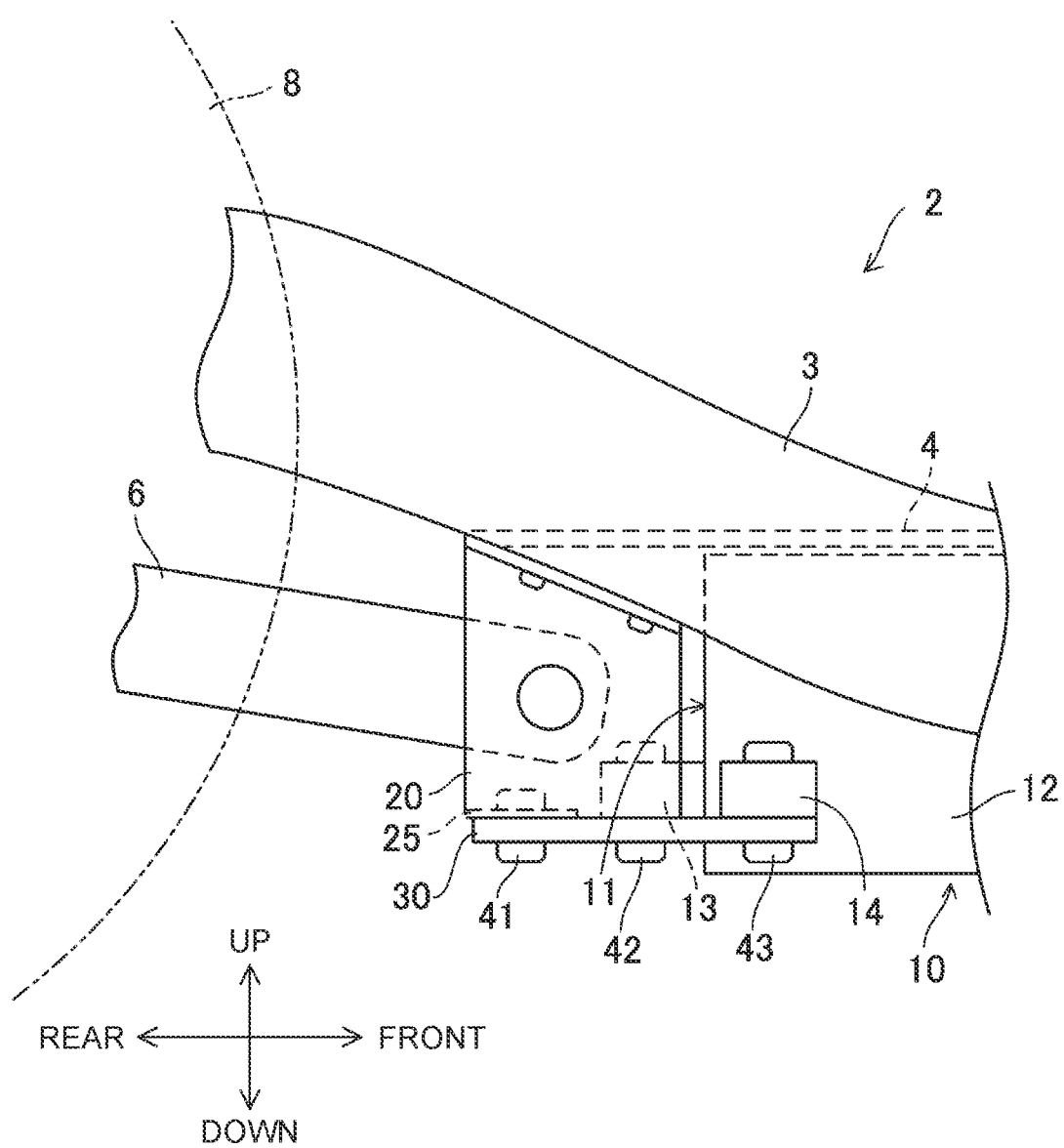
FIG. 2 is a side view of the vehicle body as viewed from a direction of arrow II in FIG. 1.
Figure 3:
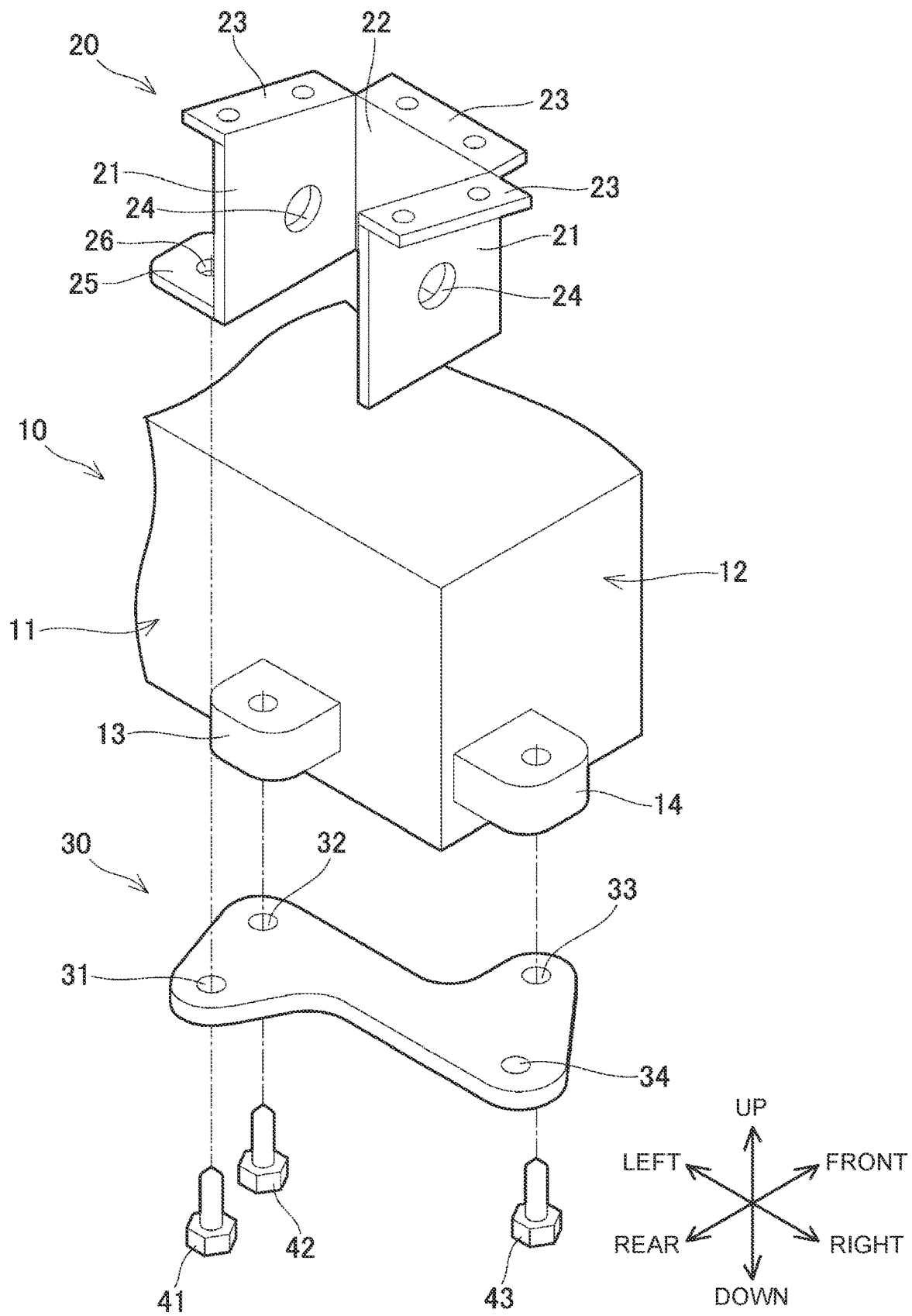
FIG. 3 is a disassembled perspective view of a bracket, a reinforcing brace, and a battery pack.

A vehicle body base structure according to a first embodiment will be described with reference to the drawings. FIG. 1 is a bottom view of a vehicle body 2 employing the vehicle body base structure according to the first embodiment. FIG. 2 is a side view of the vehicle body 2 as viewed from a direction of arrow II in FIG. 1. FIG. 3 is a disassembled perspective view of a battery pack 10, a bracket 20, and a reinforcing brace 30. FIGS. 1 and 2 illustrate only a portion of the vehicle body 2 (vicinity of the bracket 20). In FIG. 2, a bolt 44 (described later) and a rocker 5 (described later) are omitted from illustration, and a right rear wheel 8 is drawn by an imaginary line. Note that while FIGS. 1 and 2 illustrate the bracket 20 on the right side of the vehicle body 2, the vehicle body has a pair of brackets, right and left. The bracket on the left side of the vehicle body 2 also has the same structure as the bracket 20 on the right side.

The vehicle body 2 is a vehicle body of a battery electric vehicle. The battery pack 10 is disposed beneath a floor panel 4 of the vehicle body 2. The battery pack 10 is disposed to a side of the rocker 5. The battery pack 10 supplies electric power to a traction motor (omitted from illustration). The battery pack 10 is fixed to the rocker 5 and a rear side member 3. A fixing structure of the battery pack 10 and the rocker 5 is omitted from illustration.

The battery pack 10 is fixed to the rocker 5 and is also fixed to the rear side member 3 via the bracket 20 and the reinforcing brace 30. The bracket 20 is fixed to the rear side member 3, and pivotally supports a trailing arm 6. An upper end of the bracket 20 is fixed to a lower face of the rear side member 3. The bracket 20 is located rearward from the battery pack 10 in a vehicle front-rear direction.

As illustrated in FIG. 3, the bracket 20 has a pair of side plates 21 and a front plate 22 linking the side plates 21. Flanges 23 are provided at upper ends of the side plates 21 and the front plate 22, and the flanges 23 are fixed to the rear side member 3 (omitted from illustration in FIG. 3).

A hole 24 is provided in each of the side plates 21. A distal end of the trailing arm 6 is inserted between the side plates 21, and a shaft at the distal end of the trailing arm 6 is rotatably supported in the holes 24. A rear end of the trailing arm 6 supports a rear wheel axle (omitted from illustration).

A flange 25 is also provided at a lower end of one side plate 21 of the bracket 20. The flange 25 extends in a horizontal direction, and is provided with a hole 26 therein. The bracket 20 and the battery pack 10 are linked by the reinforcing brace 30. The reinforcing brace 30 is a steel plate. A plurality of holes (a first hole 31, a second hole 32, a third hole 33, and a fourth hole 34) is provided in the reinforcing brace 30, and a bolt 41 is inserted through the first hole 31 and the hole 26 of the bracket 20, thereby linking the bracket 20 and the reinforcing brace 30.

A protrusion 13 is provided on a rear face 11 of the battery pack 10, and a protrusion 14 is provided on a side face 12 of the battery pack 10. The reinforcing brace 30 is fixed to the protrusions 13 and 14. A bolt 42 passing through the second hole 32 of the reinforcing brace 30 is fixed to the protrusion 13, and another bolt 43 passing through the third hole 33 is fixed to the protrusion 14.

The reinforcing brace 30 is also fixed to the rocker 5. The bolt 44 passing through the fourth hole 34 of the reinforcing brace 30 is fixed to the rocker 5. The bolt 44 is illustrated in the bottom view in FIG. 1.

The features and advantages of the vehicle body base structure according to the embodiment will be described. The bracket 20 pivotally supports the trailing arm 6. The rear end of the trailing arm 6 supports the axle. The rear end of the trailing arm 6 receives vibration loads in the front-rear direction and an up-down direction from the axle. Accordingly, the bracket 20 receives vibration loads from the trailing arm 6. The rear end of the trailing arm 6 is pivotally supported by the bracket 20 so as to rock up and down, and accordingly the vibration load is mainly applied to the bracket 20 in the front-rear direction. The bracket 20 needs to have sufficient strength to withstand the vibration load in the front-rear direction that is conveyed from the trailing arm 6.

As best illustrated in FIG. 2, the bracket 20 is located rearward from the battery pack 10, with the upper end thereof fixed to the rear side member 3 and a lower end thereof fixed to the reinforcing brace 30. The reinforcing brace 30 is fixed to the battery pack 10. The bracket 20 that is located rearward of the battery pack 10 is linked to the rear face 11 of the battery pack 10 via the reinforcing brace 30. By employing the reinforcing brace 30, the strength of the bracket 20 is improved with respect to vibrations of the trailing arm 6.

The reinforcing brace 30 is fixed to the flange 25 on the lower end of the bracket 20. The upper end of the bracket 20 is fixed to the rear side member 3, and the lower end thereof is fixed to the battery pack 10 via the reinforcing brace 30. The top and bottom of the bracket 20 are fixed, and accordingly the bracket 20 exhibits great strength against vibration loads in the front-rear direction.

Also, as illustrated in FIG. 1, a fastening point (the bolt 41) of the bracket 20 and the reinforcing brace 30 is located rearward from the battery pack 10 in the vehicle front-rear direction, and further, the reinforcing brace 30 is fixed to the rear face 11 of the battery pack 10 in the vehicle front-rear direction (more precisely, the reinforcing brace 30 is fixed to the protrusion 13 protruding from the rear face 11). According to this structure, the front-rear direction vibration load applied to the bracket 20 is effectively conveyed to the battery pack 10 via the reinforcing brace 30. That is to say, the reinforcing brace 30 and the battery pack 10 increase the strength of the bracket 20.

The reinforcing brace 30 is fixed not only to the rear face 11 of the battery pack 10, but also to the side face 12 of the battery pack 10 in the vehicle front-rear direction (more precisely, the reinforcing brace 30 is fixed to the protrusion 14 protruding from the side face 12). This structure improves the rigidity of the reinforcing brace 30 about the roll axis. The roll axis is an axis parallel to the front-rear direction of the vehicle. The vehicle body 2 has a pair of the brackets 20 and a pair of the trailing arms 6. One bracket 20 and one trailing arm 6 are located near the right rear wheel 8, and the other bracket 20 and the other trailing arm 6 are located near a left rear wheel. The right rear wheel and the left rear wheel each vibrate independently in the up-down direction, and accordingly moment about the roll axis acts on the rear portion of the vehicle body 2. The reinforcing brace 30 is fixed to the rear face 11 and the side face 12 of the battery pack 10, and thus rigidity about the roll axis is increased. The reinforcing brace 30 that has great rigidity about the roll axis contributes to raising the rigidity of the vehicle body 2 about the roll axis.

Second Embodiment

Figure 4:
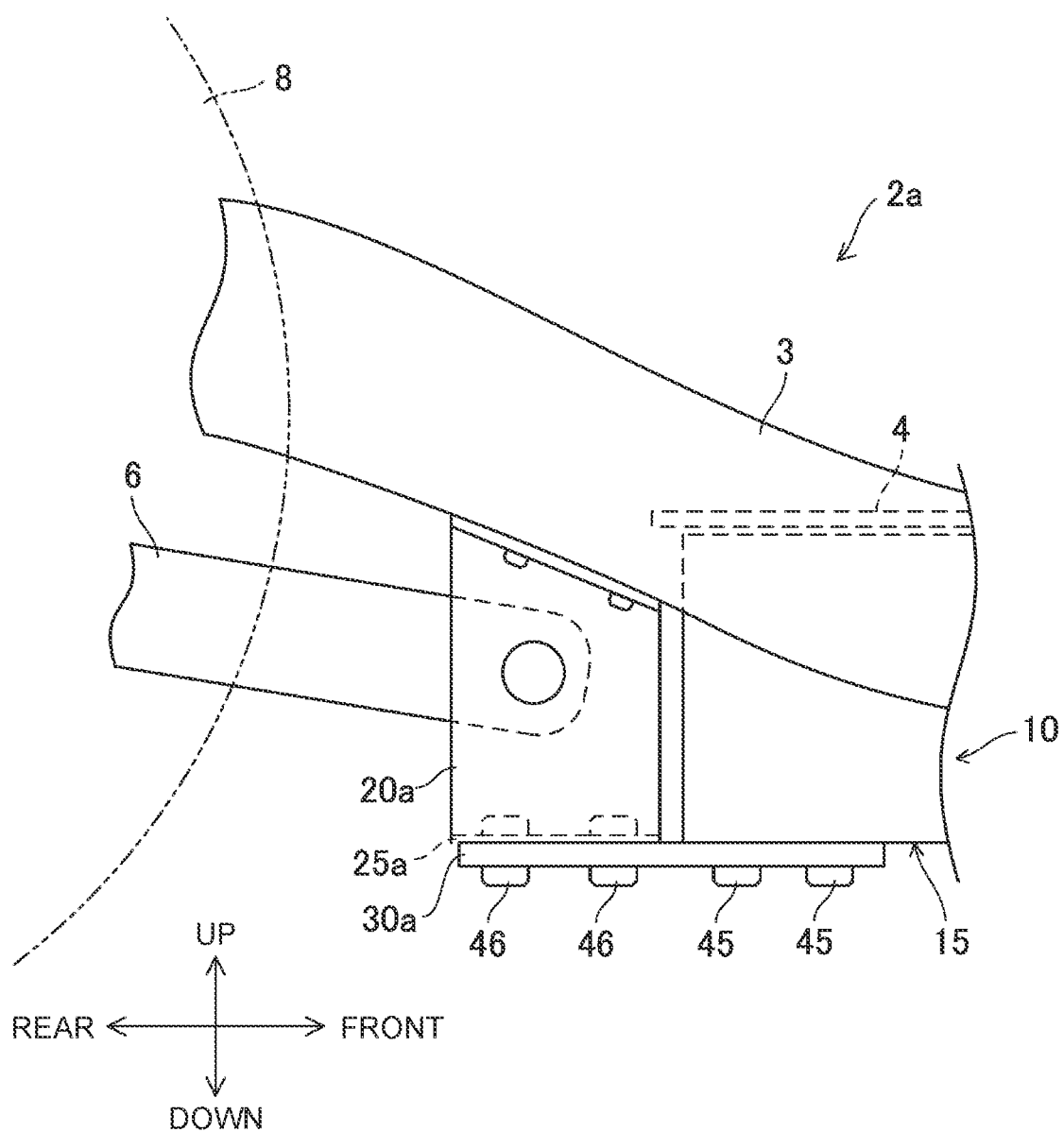
FIG. 4 is a side view illustrating a vehicle body base structure according to a second embodiment.

FIG. 4 illustrates a second embodiment of a vehicle body base structure. FIG. 4 is a side view of a vehicle body 2a employing the vehicle body base structure according to the second embodiment. A reinforcing brace 30a is fixed to a flange 25a at a lower end of a bracket 20a by two bolts 46, and is also fixed to a lower face 15 of the battery pack 10 by two bolts 45. Such a structure (the vehicle body base structure according to the second embodiment) also contributes to the reinforcing brace 30a increasing the strength of the bracket 20a with respect to vibrations of the trailing arm 6.

While specific examples of the present disclosure have been described in detail above, these are merely exemplary, and are not intended to limit the scope of the claims. The technology described in the claims includes various modifications and alterations of the specific examples exemplified above. The technical elements described in the present specification or in the drawings have technical utility alone or in various combinations, and are not limited to the combinations described in the claims as originally filed. Also, the technology exemplified in the present specification or in the drawings may achieve a plurality of objects at the same time, and has technical utility by achieving one of such objects by itself.

What is claimed is:

1. A vehicle body base structure comprising:
a battery pack that is configured to supply electric power to a traction motor and that is disposed beneath a floor panel;
a bracket that pivotally supports a trailing arm and that is fixed to a rear side member, the bracket being located rearward from the battery pack in a vehicle front-rear direction; and
a reinforcing brace that is fixed to the bracket by a fastener and that is also fixed to the battery pack, a fastening point of the reinforcing brace and the bracket being located rearward beyond a terminal end of the battery pack in the vehicle front-rear direction.

2. The vehicle body base structure according to claim 1, wherein the reinforcing brace is fixed to a rear face of the battery pack in the vehicle front-rear direction.

3. The vehicle body base structure according to claim 2, wherein the reinforcing brace is fixed to a side face of the battery pack in the vehicle front-rear direction.

4. The vehicle body base structure according to claim 1, further comprising:
a flange extending horizontally at a lower end of the bracket, wherein
the reinforcing brace is fixed to the flange.

5. The vehicle body base structure according to claim 1, wherein the reinforcing brace is fixed to a lower face of the battery pack.

6. A vehicle body base structure comprising:
a battery pack that is configured to supply electric power to a traction motor and that is disposed beneath a floor panel;
a bracket that pivotally supports a trailing arm and that is fixed to a rear side member, the bracket being located rearward from the battery pack in a vehicle front-rear direction; and
a reinforcing brace that is fixed to the bracket by a fastener and that is also fixed to the battery pack, the reinforcing brace is fixed to a rear face at a terminal end of the battery pack in the vehicle front-rear direction.

7. The vehicle body base structure according to claim 6, wherein a fastening point of the reinforcing brace and the bracket is located rearward from the battery pack in the vehicle front-rear direction.

8. The vehicle body base structure according to claim 6, wherein the reinforcing brace is fixed to a side face of the battery pack in the vehicle front-rear direction.

9. The vehicle body base structure according to claim 6, further comprising:
a flange extending horizontally at a lower end of the bracket, wherein
the reinforcing brace is fixed to the flange.

10. A vehicle body base structure comprising:
a battery pack that is configured to supply electric power to a traction motor and that is disposed beneath a floor panel;
a bracket that pivotally supports a trailing arm and that is fixed to a rear side member, the bracket being located rearward from the battery pack in a vehicle front-rear direction;
a reinforcing brace that is fixed to the bracket and that is also fixed to the battery pack; and
a flange fixed to and extending horizontally from a lower end of the bracket, the reinforcing brace being fixed to the flange, the bracket connected to the battery pack by the sequential connection of the bracket to the flange, the flange to the reinforcing brace, and the reinforcing brace to the battery pack.

11. The vehicle body base structure according to claim 10, wherein a fastening point of the reinforcing brace and the bracket is located rearward from the battery pack in the vehicle front-rear direction.

12. The vehicle body base structure according to claim 10, wherein the reinforcing brace is fixed to a rear face of the battery pack in the vehicle front-rear direction.

13. The vehicle body base structure according to claim 12, wherein the reinforcing brace is fixed to a side face of the battery pack in the vehicle front-rear direction.

14. The vehicle body base structure according to claim 10, wherein the reinforcing brace is fixed to a lower face of the battery pack.

15. The vehicle body base structure according to claim 10, wherein the flange is integrally formed with the bracket.

* * * * *